(12) United States Patent
Ronström

(10) Patent No.: US 7,181,453 B2
(45) Date of Patent: Feb. 20, 2007

(54) METHOD FOR CONCURRENCY CONTROL FOR A SECONDARY INDEX

(75) Inventor: Mikael Ronström, Hägersten (SE)

(73) Assignee: MySQL AB, Uppsala (SE)

( * ) Notice: Subject to any disclaimer, the term of this patent is extended or adjusted under 35 U.S.C. 154(b) by 124 days.

(21) Appl. No.: 10/481,301

(22) PCT Filed: Jun. 28, 2001

(86) PCT No.: PCT/SE01/01479

§ 371 (c)(1),
(2), (4) Date: Dec. 19, 2003

(87) PCT Pub. No.: WO03/003251

PCT Pub. Date: Jan. 9, 2003

(65) Prior Publication Data

US 2004/0167927 A1 Aug. 26, 2004

(51) Int. Cl.
    *G06F 17/30* (2006.01)
(52) U.S. Cl. .............................. 707/8; 707/2
(58) Field of Classification Search ............... 707/1–5, 707/100, 8
    See application file for complete search history.

(56) References Cited

U.S. PATENT DOCUMENTS

| 5,101,488 A | 3/1992 | Rosenthal et al. |
| 5,280,612 A | 1/1994 | Lorie et al. |
| 5,485,607 A | 1/1996 | Lomet et al. |
| 5,596,754 A | 1/1997 | Lomet |
| 5,625,815 A * | 4/1997 | Maier et al. .................... 707/8 |
| 5,692,178 A * | 11/1997 | Shaughnessy .................. 707/8 |
| 5,933,820 A | 8/1999 | Beier et al. |
| 5,960,194 A * | 9/1999 | Choy et al. ................. 707/102 |

OTHER PUBLICATIONS

European Patent Office, Communication pursuant to Article 96(2) EPC, Aug. 3, 2005.
David Lomet, Key Range Locking Strategies for Improved Concurrency, Cambridge Research Laboratory Technical Report Series, Feb. 10, 1993, , CRL 93/2, Digital Equipment Corporation Cambridge Research Lab, Cambridge Massachusetts.
Philip A. Bernstein, Vassos Hadzilacos, Nathan Goodman, , Concurrency Control and Recovery in Database Systems, 1987, ,Addison-Wesley Publishing Company, Reading Massachusetts.
Elena Barcucci, Renzo Pinzani, and Renzo Sprugnoli, Optimal Selection of Secondary Indexes, IEEE Transactions on Software Engineering, Jan. 1990, pp. 32-38, vol. 16, No. 1.

(Continued)

*Primary Examiner*—Greta Robinson
*Assistant Examiner*—Cheryl Lewis
(74) *Attorney, Agent, or Firm*—Whiteford, Taylor & Preston LLP; Jeffrey C. Maynard

(57) ABSTRACT

The present invention relates to a method and a computer program for concurrency control for a secondary index (13) wherein many deadlocks are avoided by means of a selective locking strategy and by means of allowing index records (14) of the secondary index to contain some keys to many but never too few. When keys are read from the secondary index (13) it is thus possible to read some keys that may be irrelevant. However, such irrelevant keys are sorted out by means of checking against the corresponding records (12) in the table (11) to which the secondary index (13) is associated. The selective locking strategy allows for increased concurrency.

22 Claims, 4 Drawing Sheets

OTHER PUBLICATIONS

Shang-Sheng Tung, Hongyuan Zha, and Thomas Keefe, Indexing Management for Distributed Linear Hash Files, 7th International Workshop on Database and Expert Systems Applications, Sep. 9-13, 1996, pp. 106-114, IEEE, Zurich, Switzerland.

* cited by examiner

| Customer ID (Key) | Customer Name | Credit | Credit Card Type |
|---|---|---|---|
| 1 | Adam | 2000 | AMEX |
| 2 | Larry | 2000 | EURO |
| 3 | Michael | 1000 | DINER |
| 4 | Barry | 500 | NULL |
| 5 | Paul | 1000 | AMEX |
| 6 | Mary | 1000 | AMEX |
| 7 | Leila | 1000 | DINER |
| 8 | Joey | 2000 | NULL |
| 9 | Marianne | 4000 | EURO |
| 10 | Percy | 500 | AMEX |
| ⋮ | ⋮ | ⋮ | ⋮ |

| Credit | Index Entries (Keys) |
|---|---|
| 500 | 4, 10 |
| 1000 | 3, 5, 6, 7 |
| 2000 | 1, 2, 8 |
| 4000 | 9 |
| ⋮ | ⋮ |

Fig. 1

| Ongoing \ Incoming | Add | Write | Delete | Read |
|---|---|---|---|---|
| Add | Y | Y | Y | Y |
| Write | Y | Y | Y | Y |
| Delete | Y | Y | Y | Y |
| Read | Y | Y | Y | N |

Fig. 2

| Ongoing \ Incoming | Add | Write | Delete | Read |
|---|---|---|---|---|
| Add | N | N | N | N |
| Write | Y | Y | N | Y |
| Delete | N | N | N | N |
| Read | Y | Y | N | N |

Fig. 3

METHOD FOR CONCURRENCY CONTROL FOR A SECONDARY INDEX

FIELD OF THE INVENTION

The present invention relates to a database management system in general and in particular to mechanisms and methods related to secondary indexes.

BACKGROUND OF THE INVENTION

A database is generally made up of one or several tables of data. The tables are made up of records (also called tuples). A record may comprise several different information elements. A record relating to a credit card customer may, for instance, comprise information regarding the customer's name, his/her current credit, the year he/she became a customer, and information regarding the type of the customer's credit card. The records are often provided with a unique key value. The record relating to the credit card customer may, for instance, be provided with a key that is a customer ID in the form of a number that is unique for the customer.

In order to allow quick and efficient access for database management programs to selected records in a table, one or several indexes are commonly used. The function of an index for a database corresponds to the function of an index in a book. The index provides a list from which a location of a desired element can be derived relatively quickly without having to search through the whole database. Indexes can be of several different types.

U.S. Pat. No. 5,960,194 describes a method for generating a multi-tiered indexing structure for a partitioned database.

A secondary index is an index that associates values of a particular information element with the keys of the records that contain each value in an appropriate field in the table. A secondary index for the example table of credit card customers may, for instance, list the different available types of credit cards and with each type of credit card associate the customer IDs of the customers that have that type of credit card.

An algorithm for optimal selection of secondary indexes is discussed in the article "Optimal Selection of Secondary Indexes" by E. Barcucci et al. Published in IEEE Transactions in Software Engineering, Vol. 16, No. 1, January 1990 pp. 32–38. The algorithm aims at minimizing the cost of transactions in which secondary indexes are involved.

U.S. Pat. No. 5,933,820 describes a method that allows for non-disruptive reorganization of data by using dual pointing with direct and indirect pointing to logically related data and data that is a target of secondary indexes.

When data in a table changes, a secondary index associated with the data may also have to be updated. The secondary index may also be useful to find records that, for instance, are to be updated in the table. Thus there are transactions that start from the table and continue to the secondary index and transactions that start from the secondary index and continue to the table. The transactions may comprise one or several table operations and/or index operations.

A normal write transaction will first operate on the record in the table by means of a write operation and thereafter on the secondary index by means of index update operations, where appropriate. The secondary index will be updated by means of Add Index Entry or Delete Index Entry or both. Add Index Entry is, as the name indicates, an operation wherein a key is added to an index record and Delete Index Entry an operation wherein a key is deleted from an index record.

Read Index Entry and Write Index Entry are operations that start by reading the secondary index and then continue to operate on the table. Read Index Entry involves reading first the keys of a certain index record and then the records of the table that correspond to the read keys. Write Index Entry involves reading the keys of a certain index record and then performing write operations on the records of the table that correspond to the read keys, followed by an update of the secondary index where appropriate.

A locking strategy is used in order to ensure that no conflicting operations are performed simultaneously on the same record or index record, which otherwise could cause errors in the database and the index. The level of concurrency depends on the locking strategy that is used. In a pessimistic locking strategy, concurrency is only allowed between two read operations, while there is no concurrency between two write operations or between a read operation and a write operation. In an environment where secondary indexes are used, which are stored in separate index tables or other types of storage containers, the pessimistic locking strategy gives bad concurrency and, at the same time, causes frequent deadlocks. A deadlock can occur when two different operations have acquired locks that stop the other operation from completing. The deadlock can be resolved by aborting one of the operations. Many of the operations described above give rise to a series of operations that require locks both on records in the table and on index records in the secondary index in order to complete. Since, in addition, some transactions start from the table and others from the secondary index, it is easily understood that a traditional locking strategy, such as the pessimistic locking strategy, often causes deadlocks. Deadlocks are naturally highly undesirable and there is thus a demand for a locking strategy that to a high degree prevents deadlocks from occurring.

U.S. Pat. No. 5,280,612 describes a database system that aims to increase the concurrency in the system and thereby reduce the waiting time for transactions that require locks due to locks set by other transactions. The concurrency is increased by maintaining at least to database versions and allowing operations to be carried out simultaneously on the different versions. The system must for this purpose include means for selection of proper record versions.

SUMMARY OF THE INVENTION

The problem to be solved by the present invention is to provide a method and arrangements for concurrency control for secondary indexes that overcome some or all of the drawbacks of the previously known methods and systems discussed above.

An object of the present invention is thus to provide a method and arrangements for concurrency control for secondary indexes that to a high degree prevents deadlocks from occurring due to operations performed on the secondary index.

The object of the present invention is achieved by means of a method as stated in claims 1–11 and by means of a computer program as stated in claims 12–22.

The present invention solves the problem mentioned above by means of a method for concurrency control for a secondary index wherein many deadlocks are avoided by means of a selective locking strategy and by means of allowing index records of the secondary index to contain some keys to many but never too few. When keys are read from the secondary index it is thus possible to read some keys that may be irrelevant. However, such irrelevant keys are sorted out by checking against the corresponding records in the table.

According to an embodiment of the method of the invention an index entry that is to be deleted is marked when the Delete Index Entry operation is started and not deleted until the Delete Index Entry operation is committed. All Read Index Entry operations will read all entries of an index record, also entries that are marked to be deleted and entries that are to be added, but for which the add index entry operation has not been committed yet. The result of the Read Index Entry is verified by checking the records in the table that correspond to the read index entries, in order to ascertain that records that have changed and may have become inconsistent with the secondary index are read correctly.

The above stated problem is, according to the invention, also solved by means of a computer program particularly arranged for carrying out the inventive method of concurrency control for secondary indexes.

An advantage of the present invention is that it significantly reduces the risk for deadlocks to occur. Many of the situations that gave rise to deadlocks with previously known methods and mechanism will, with the concurrency control according to the present invention, not cause deadlocks. In fact, with the present invention no deadlocks caused by access to the secondary index occur. This means that the amount of possible deadlocks does not increase when a secondary index is introduced and the method according to the present invention is used.

Another advantage with the present invention is that it allows for increased concurrency thanks to the selective locking strategy, which allows many combinations of operations to occur simultaneously that where not allowed with the pessimistic locking strategy. The more liberal locking strategy of the present invention is possible much thanks to the fact that it, according to the present invention, is acceptable that too many keys are read from the secondary index at some instances.

Yet another advantage of the present invention is that it reduces the lock waiting time. Since the concurrency is increased by means of the invention, there will be fewer situations where it is necessary for an operation to wait for another operation to release a lock.

The invention will now be described with the aid of preferred embodiments and with reference to accompanying drawings.

BRIEF DESCRIPTION OF THE DRAWINGS

FIG. 1 shows a block schedule over a database table and a secondary index of the table.

FIG. 2 shows a contention matrix for the previously known pessimistic locking strategy.

FIG. 3 shows a contention matrix for the locking strategy of the present invention.

DETAILED DESCRIPTION OF SPECIFIC EMBODIMENTS

Figure 4A:
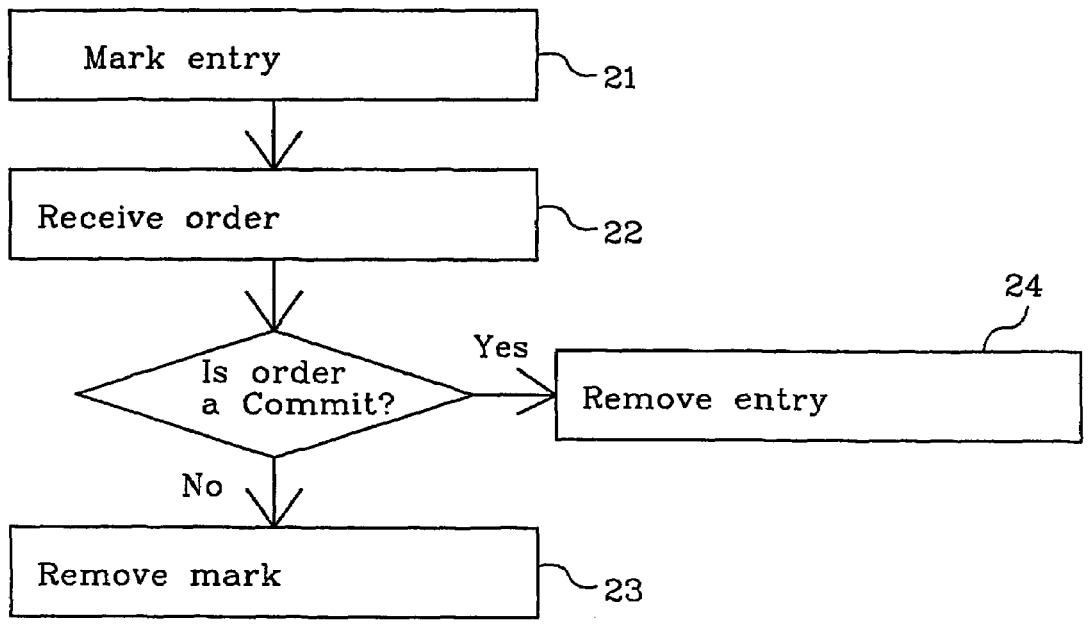
FIGS. 4a–4d show flow charts of how index operations are performed according to embodiments of the method for concurrency control of the present invention.

FIG. 1 shows an example of a database table 11 that contains data related to credit card customers. The table includes a record 12 for each customer. The records each comprise four different fields in which information regarding the customer's ID, the customer's name, the customer's credit, and the customer's type of credit card is stored, respectively. The customer ID is a unique key that is used to identify a particular record. A secondary index 13 of the table 11 is also shown in FIG. 1. The secondary index 13 is built on the credit of the customers, but it is also possible to build secondary indexes based on other types of fields of the table 11, e.g. credit card type. The secondary index contains an index record 14 for each value of the credit fields of the table 11. The index records contain a credit value and a list of the keys that correspond to the records of the table that has the particular credit value in their credit field. By means of the secondary index 13 it is thus possible to quickly find all the records that contain a particular record value without having to search through the entire table. The table 11 is very small in order to provide a simple and clear illustration. However, in reality the table 11 can be much larger with many more records and many more fields per record. It is easily understood that when the number of records in the table is very large, the secondary index can save much time and effort in finding a particular set of records.

As mentioned above, there are commonly four different types of index operations that are used in connection with secondary indexes, namely Add Index Entry, Delete Index Entry, Read Index Entry, and Write Index Entry. Just as the secondary index is related to the table, the index operations are related to operations that have been or will be performed on the table. Each type of operation and its possible relationship with table operations will now be explained in greater detail.

Add Index Entry means that an index entry, i.e. a key, is added to an index record 14. It is necessary to perform an Add Index Entry operation to update the secondary index when a write operation that has changed a credit value has been performed on the table. If, for instance, the credit value of the record with key value 1 has changed from 2000 to 500, the key value 1 should be added to the list of keys of the index record for credit value 500.

Delete Index Entry means that an index entry is deleted from an index record 14. In the case above, when the record with key value 1 has changed from 2000 to 500, the key value 1 should be deleted from the list of keys of the index record for credit value 2000, in order to maintain consistency between the table 11 and the secondary index 13.

Read Index Entry means that the keys of a particular index record are read. The result of the Read Index Entry can then be used to, for instance, read a certain field of the table records that correspond to the read keys. Assume that it is of interest to find the names of the customers with credit value 500 in the table 11 in FIG. 1. Read Index Entry can be used on the secondary index 13 to find the keys of the records with credit value 500. The Read Index Entry operation will return the key values 4 and 10, which are used to perform read operations on the records with keys 4 and 10 in the table 11, in order to read the customer names Barry and Percy. The Read Index Entry operation will not change the secondary index 13. However, the Read Index Entry can be combined with write operations in a transaction.

Write Index Entry means that the keys of a particular index record are read for the purpose of performing write operations on the records that correspond to the particular keys. The Write Index Entry may, for instance, be useful in the example shown in FIG. 1 if it is of interest to change all the credit values that are now 500 to 1000. The Write Index Entry operation includes the add and delete operations that are necessary in order to update the secondary index 13 after writing to the table 11.

As mentioned above, a locking strategy is used in order to ensure that no conflicting operations are performed simultaneously on the same table record or index record. In a pessimistic lock strategy, all types of write operations will acquire a write lock on the record or records to be written. The write lock is an exclusive lock that prevents any other operation to be performed on the locked record/s. Such other operations will thus have to wait until the lock is released when the write operation that acquired the lock has completed. A read operation will, in the pessimistic locking strategy, acquire a read lock on the record or records to be read. The read lock will prevent write operations to be performed on the locked record/s, but will allow other read operations to be performed simultaneously with the first read operation. A contention matrix for the pessimistic locking strategy applied on the index operations described above can be drawn and is shown in FIG. 2.

In the contention matrix shown in FIG. 2, the different types of index operations are listed as column and row headings. The cells of the matrix contains either a Y or an N that denotes Yes there is contention, or No there is no contention, when the operation of the column occurs while the operation of the row is being performed. It can be seen from the contention matrix in FIG. 2 that the pessimistic locking strategy only allows concurrency between two Read Index Entry operations.

When the pessimistic locking strategy is used for the table 11 and for the secondary index 13, there is a fairly high risk that a deadlock arises. It will now be illustrated how a deadlock can arise by means of an example based on the table 11 and the secondary index 13.

Assume that the credit of the record with key 7 is to be changed from 1000 to 2000. A transaction will for this purpose be performed that starts with a write operation on the table 11 that sets a write lock on the record with key 7. Now, further assume that just as the write operation has locked the record in table 11, a Write Index Entry operation starts that should update all records with credit value 1000 to credit value 500. The Write Index Entry operation starts from the secondary index and sets a write lock on the index record that corresponds to credit value 1000 and on the index record that corresponds to the credit value 500. By this time a deadlock has occurred. In order to finish, the first transaction, which has locked the record with key 7 in the table 11, has to update the secondary index by deleting the key value 7 from the index record for credit value 1000 and adding the key value 7 to the index record for credit value 2000. However, since the Write Index Entry operation already has locked the index record for credit value 1000, it is not possible for the transaction that started from the table 11 to finish. It is neither possible for the Write Index Entry operation to finish, since it has to lock and update the records in the table 11 with key value 3, 5, 6 and 7, of which the record with key value 7 already is locked. The deadlock can be resolved by aborting one of the operations but this is highly undesirable. It can be appreciated that, when the pessimistic locking strategy is used for the table 11 and the secondary index 13, deadlocks may arise in many situations due to the fact that some operations start by locking table records 12 and others start by locking index records 14.

The present invention provides a method for concurrency control in secondary indexes, which involves a locking strategy for a secondary index that considerably reduces the risk for deadlocks. The contention matrix that corresponds to the locking strategy of the present invention is shown in FIG. 3. A comparison between the contention matrix of FIG. 2 and the contention matrix of FIG. 3 shows that there are much fewer situations that cause contention with the locking strategy of the invention than with the pessimistic locking strategy. Less contention means that the concurrency can be increased, i.e. the locking strategy of the present invention allows more operations to take place simultaneously than the pessimistic locking strategy.

The locking strategy of the present invention is more selective than the pessimistic locking strategy. A Read Index Entry operation will, for instance, acquire a lock on a record that prevents an Add Index Entry or a Write Index Entry operation to be performed on the same record, but allows the other Index Entry operations, i.e. Delete and Read, to be performed simultaneously (see FIG. 3). The Delete Index Entry operation will not stop any other operations from continuing, and no other index operation will prevent the Delete Index Entry operation from continuing. Thus, there will be no deadlocks caused by Delete Index Entry operations when the method according to the present invention is used.

There are a number of prerequisites of the method for concurrency control in secondary indexes of the present invention that makes it possible to use the selective locking strategy. These prerequisites involve adaptations to how the Index operations are performed, which are discussed below.

According to the present invention, the Delete Index Entry operation is modified such that the entry to be deleted is marked but not removed, to begin with. The entry to be deleted is not removed until the Delete Index Entry is committed. If the Delete Index Entry is not committed but instead aborted, the mark on the entry is removed. Delete Index Entry operations can thus, according to the present invention, always be accepted since they only mark entries as deleted.

According to the present invention, Read Index Entry operations will read all entries of a record, also entries that are marked to be deleted. An Add Index Entry operation will, according to the present invention, not stop a Read Index Entry operation from continuing and, it is thus possible for a Read Index Entry to read entries that have been added but which have not been committed yet. To ensure that reads are consistent with the content of the table, all Read Index Entry operations are checked against the table. The Read Index Entry operation should read the key values (entries) that correspond to records that fulfill a certain search condition. Since the invention allows keys to be read which relate to uncommitted operations, it is necessary to check the record that correspond to each of the read keys to ensure that the record still fulfills the search condition. The record may have changed depending on whether an uncommitted operation has been aborted or committed after the Read Index Entry operation started. The Read Index Entry operation will only return the keys of the records that are checked to still fulfill the search condition. In order to perform the check in the table, the Read Index Entry will have to acquire a read lock on the table records to be checked. It is thus guaranteed that the Read Index Entry is serialized after preceding Add Index Entry or Delete Index Entry operations, since these operations will hold exclusive write locks on the table records they work on until they are either committed or aborted.

A Read Index Entry operation is, as mentioned, allowed to continue when an Add Index Entry operation is being performed. However, if the operations arrive in the opposite order, i.e. if a Read Index Entry operation has started by acquiring a selective read lock on an index record and the Add Index Entry operation arrives, the Add Index Entry operation will have to wait until the Read Index Entry has released the lock on the index record. This is necessary since the Read Index Entry operation first locks and reads an index record and then locks and reads a range of table records that correspond to the read keys. If the Add Index Entry was allowed to continue, the range of table records that are locked would have to be changed after it has been locked. This would cause undesirably complicated situations. An Add Index Entry operation that interferes with an ongoing Read Index Entry operation is thus queued after the ongoing Read Index Entry operation. However, the entry to be added is inserted such that a following Read Index Entry will see the added entry.

Add and Delete Index Entry operations are always followed by either an Abort or a Commit order. An Abort order will, for an Add Index Entry operation, result in that the added entry is removed independent of the lock situation. A Commit order that follows on an Add Index Entry operation will not do anything, since the entry has already been added to the secondary index. For a Delete Index Entry, a Commit order results in the entry being removed, while an Abort order only removes the mark that the entry was to be deleted.

There is no contention, according to the present invention, between two Add Index Entry operations. Since the Add Index Entry operation simply adds an entry to a record, there will be no problem if another operation starts to add an entry to the same record before the first Add Index Entry operation has completed.

The Write Index Entry operation sets a write lock that stops all types of operations except the Delete Index Entry operation from continuing. The Write Index Entry will, to begin with, resemble the Read Index Entry in that it reads the keys of an index record including the keys that relate to uncommitted Delete Index Entry operations or Add Index Entry operations. The table records of the read keys are then checked. The Write Index Entry differs from the Read Index Entry operation in that it acquires write locks on the table records and updates the table records for which the check shows that the search condition still is fulfilled.

There is no contention between an ongoing Add Index Entry or Delete Index Entry operation and an incoming Write Index Entry operation, according to the present invention. In order to perform the check and update in the table, the Write Index Entry will have to acquire a write lock on the table records in question. It is thus guaranteed that the Write Index Entry is serialized after preceding Add Index Entry or Delete Index Entry operations, since these operations will hold exclusive write locks on the table records they work on until they are either committed or aborted.

FIGS. 4a–d show flow charts of how the Index operations are performed, according to the present invention.

FIG. 4a shows how a Delete Index Entry operation is performed, according to the present invention. In a first step 21, the entry to be deleted is marked but not removed. In a second step 22, either an Abort or Commit order is received. If the order that is received is an Abort order the mark is removed, step 23, and if the order is a Commit order the entry is deleted, step 24.

Figure 4B:
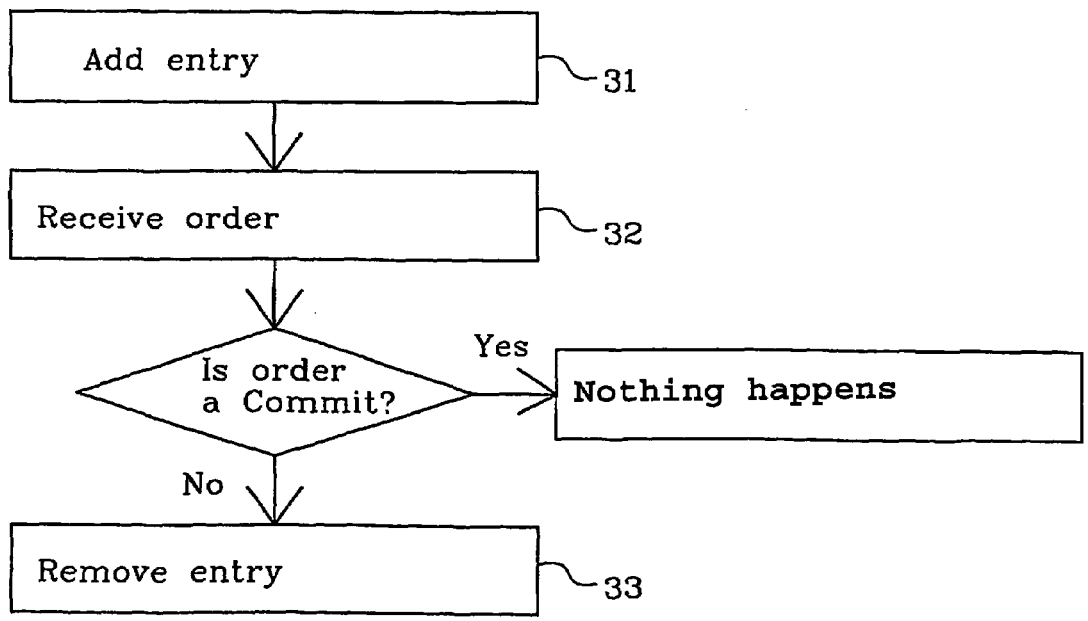

FIG. 4b shows how an Add Index Entry operation is performed, according to the present invention. In a first step 31, the entry is added. In a second step 32, either an Abort or Commit order is received. If the order that is received is an Abort order the entry that was added in the step 31 is removed, step 33, and if the order is a Commit order nothing happens.

Figure 4C:
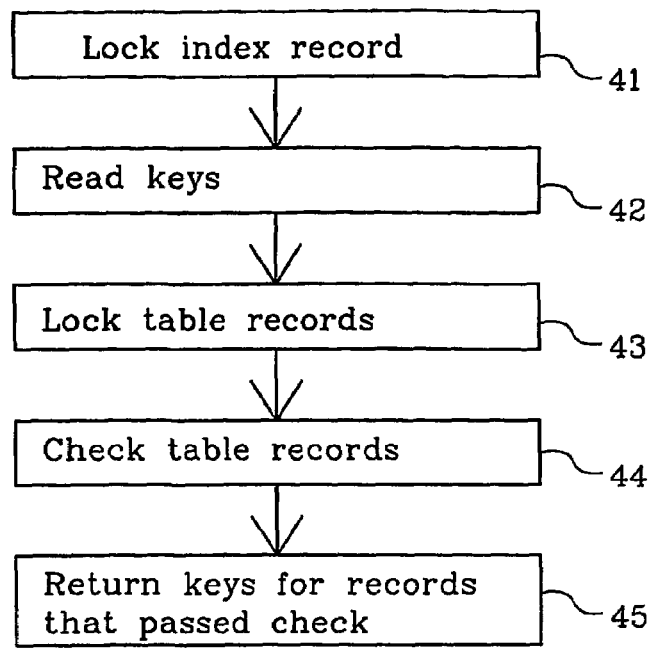

FIG. 4c shows how a Read Index Entry operation is performed, according to the present invention. In a first step 41, a read lock is placed on the index record that corresponds to a certain search condition. The keys that are listed in the index record are then read, step 42. In a following step 43, read locks are placed on the table records that correspond to the read keys. The table records are then checked to see if they still fulfill the search condition, step 44. The keys of the records that still fulfill the search condition are returned in a step 45.

Figure 4D:
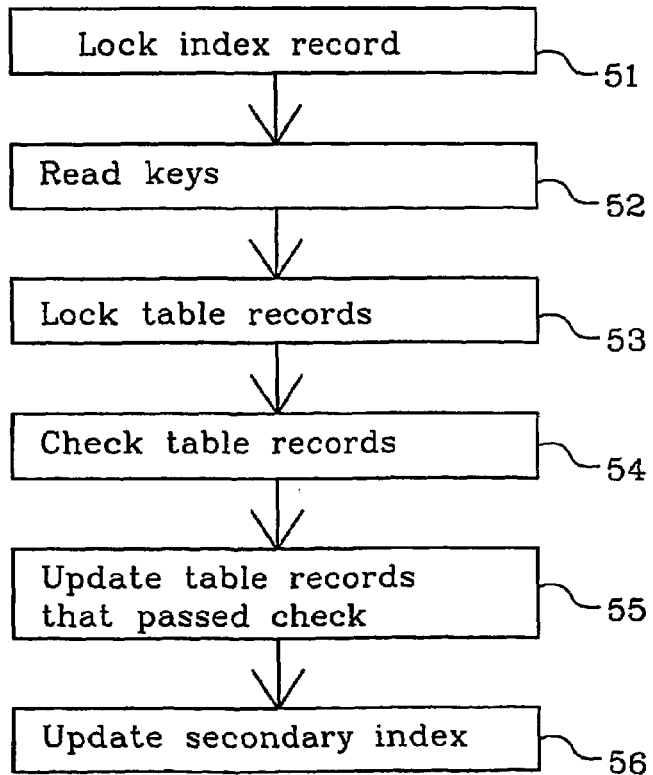

FIG. 4d shows how a Write Index Entry operation is performed, according to the present invention. In a first step 51, a write lock is placed on the index record from which keys are to be read and on any additional index record that will have to be updated as a result of the operation. The keys that are listed in the index record to be read are then read, step 52. In a following step 53, write locks placed are on the table records that correspond to the read keys. The table records are then checked to see if they still fulfill the search condition, step 54. The records that still fulfill the search condition are updated as specified in the parameters of the operation in a step 55. Depending on how the updates affected the table, the secondary index may have to be updated, step 56 by means of adding and deleting index entries in the same way as described in FIG. 4a and FIG. 4b.

The selective locking strategy and the index operations according to the present invention are preferably implemented in software in a database management system in a manner well known to the person skilled in the art.

In an alternative embodiment of the present invention, Read Index Entry operations, which are part of transactions that involve write operations, are separated from simple Read Index Entry operations, wherein the read index entries simply are read and not used as a basis for following operations belonging to the same transaction. Simple Read Index Entry operations can be recognized by associating the Read Index Entry operation with a special tag if it is the only operation involved in the current transaction. It is possible to modify the contention matrix shown in FIG. 3, for the case when a simple Read Index Entry operation has started, by placing a read lock on an index record and an Add Index Entry operation for the same index record arrives. The Add Index Entry operation can be allowed to continue as soon as the simple Read Index Entry operation has read the entries of the record. This is possible since the simple Read Index Entry operation simply reads keys and does not use the result of the read for a following update.

According to the present invention, table records are locked by means of the same locking strategy as before, but the secondary index is locked by means of selective locking strategy that increases concurrency and reduces deadlocks. The selective locking strategy is made possible by adapting some index operations and allowing the index records of the secondary index to contain some entries too many for some periods of time but never too few entries. Entries that are read from the secondary index are checked before the result of the read is returned in order to make sure that only relevant entries are returned.

The person skilled in the art will appreciate that modifications of the present invention are possible. The contention matrix shown in FIG. 3 differs from the contention matrix shown in FIG. 2 on several points. It is however, possible to use a locking strategy that has a contention matrix that is a combination between the contention matrix of FIG. 3 and the contention matrix of FIG. 2 and still obtain some or most of the benefits of the present invention. It is, for instance, possible to perform Delete Index Entry operations in the manner of the present invention as described above and use a locking strategy that always allows Delete Index Entry operations to continue, but which locking strategy in all other aspects resembles the pessimistic locking strategy. In this way, concurrency would be increased to some extent and the risk for deadlocks would decrease somewhat.

The invention claimed is:

1. A computer implemented method for concurrency control for a secondary index associated with a database table, which secondary index includes index records, wherein each index record contains a list of entries, which are unique keys each identifying a table record of the database table, which method involves performing index operations on the index records according to a locking strategy for locking the index records, wherein the method comprises:
   allowing the index operation of type Delete Index Entry to operate on an index record concurrently with any other index operation of type Add Index Entry, Write Index Entry, Delete Index Entry, or Read Index Entry even when the other index operation holds a lock on the index record, and
   performing the index operation of type Delete Index Entry such that an entry to be deleted from the index record is not removed from the index record until the index operation of type Delete Index Entry is committed.

2. The method for concurrency control for a secondary index according to claim 1, wherein any index operation is allowed to operate on an index record while an index operation of type Delete Index Entry is operating on the index record.

3. The method for concurrency control for a secondary index according to claim 1, wherein the index operation of type Delete Index Entry is performed such that an entry to be deleted from the index record is marked, which marked entry is readable by an index operation of type Read Index Entry.

4. The method for concurrency control for a secondary index according to claim 3, wherein the index operation of type Read Index Entry is performed according to the steps of:
   reading all entries listed in an index record that relate to a first search condition,
   checking the table records identified by the read entries to see which table records fulfill the first search condition, and
   returning the entries that identify the table records that still fulfill the first search condition.

5. The method for concurrency control for a secondary index according to claim 1, wherein any index operation is allowed to operate on an index record while an index operation of type Add Index Entry is operating on the index record.

6. The method for concurrency control for a secondary index according to claim 5, wherein the index operation of type Add Index Entry is performed according to the steps of:
   adding an entry to an index record when the index operation of type Add Index Entry is started, and
   removing the added entry if the index operation of type Add Index Entry is aborted.

7. The method for concurrency control for a secondary index according to claim 1, wherein any index operation is allowed to operate on an index record while an index operation of type Write Index Entry is operating on the index record.

8. The method for concurrency control for a secondary index according to claim 7, wherein the index operation of type Write Index Entry is performed according to the steps of:
   reading all entries listed in an index record that relate to a first search condition,
   checking the table records identified by the read entries to see which table records fulfill the first search condition,
   updating the table records that still fulfill the first search condition, and
   updating the secondary index to be consistent with the updated database table.

9. The method for concurrency control for a secondary index according to claim 1, wherein the locking strategy is arranged to allow concurrency between an incoming index operation of type Add Index Entry and another ongoing index operation of type Add Index Entry or Delete Index Entry and to forbid concurrency between an incoming index operation of type Add Index Entry and another ongoing index operation of type Write Index Entry or Read Index Entry.

10. The method for concurrency control for a secondary index according to claim 1, wherein the locking strategy is arranged to allow concurrency between an incoming index operation of type Write Index Entry and another ongoing index operation of type Delete Index Entry or Add Index Entry, and to forbid concurrency between an incoming index operation of type Write Index Entry and another ongoing index operation of type Write Index Entry or Read Index Entry.

11. The method for concurrency control for a secondary index according to claim 1, wherein the locking strategy is arranged to allow concurrency between an incoming index operation of type Read Index Entry and another ongoing index operation of type Add Index Entry, Delete Index Entry or Read Index Entry, and to forbid concurrency between an incoming index operation of type Read Index Entry and another ongoing index operation of type Write Index Entry.

12. A computer program product for a database management system, which computer program product comprises code means residing on a computer readable medium, wherein said code means are arranged to perform a method for concurrency control for a secondary index associated with a database table, which secondary index includes index records, wherein each index record contains a list of entries, which are unique keys each identifying a table record of the database table, which method involves performing index operations on the index records according to a locking strategy for locking the index records, when said computer program is executed by a computer of the database management system, wherein the method comprises:
   allowing the index operation of type Delete Index Entry to operate on an index record concurrently with any other index operation of type Add Index Entry, Write Index Entry, Delete Index Entry, or Read Index Entry even when the other index operation holds a lock on the index record, and
   performing the index operation of type Delete Index Entry such that an entry to be deleted from the index record is not removed from the index record until the index operation of type Delete Index Entry is committed.

13. The computer program product for a database management system according to claim 12, wherein any index operation is allowed to operate on an index record while an index operation of type Delete Index Entry is operating on the index record.

14. The computer program product for a database management system according to claim 12, wherein the index operation of type Delete Index Entry is performed such that an entry to be deleted from the index record is marked, which marked entry is readable by an index operation of type Read Index Entry.

15. The computer program product for a database management system according to claim 14, wherein the index operation of type Read Index Entry is performed according to the steps of:

reading all entries listed in an index record that relate to a first search condition, checking the table records identified by the read entries to see which table records fulfill the first search condition, and returning the entries that identify the table records that still fulfill the first search condition.

16. The computer program product for a database management system according to claim 12, wherein any index operation is allowed to operate on an index record while an index operation of type Add Index Entry is operating on the index record.

17. The computer program product for a database management system according to claim 16, wherein the index operation of type Add Index Entry is performed according to the steps of:

adding an entry to an index record when the index operation of type Add Index Entry is started, and removing the added entry if the index operation of type Add Index Entry is aborted.

18. The computer program product for a database management system according to claim 12, wherein any index operation is allowed to operate on an index record while an index operation of type Write Index Entry is operating on the index record.

19. The computer program product for a database management system according to claim 18, wherein the index operation of type Write Index Entry is performed according to the steps of:

reading all entries listed in an index record that relate to a first search condition, checking the table records identified by the read entries to see which table records fulfill the first search condition, updating the table records that still fulfill the first search condition, and updating the secondary index to be consistent with the updated database table.

20. The computer program product for a database management system according to claim 12, wherein the locking strategy is arranged to allow concurrency between an incoming index operation of type Add Index Entry and another ongoing index operation of type Add Index Entry or Delete Index Entry and to forbid concurrency between an incoming index operation of type Add Index Entry and another ongoing index operation of type Write Index Entry or Read Index Entry.

21. The computer program product for a database management system according to claim 12, wherein the locking strategy is arranged to allow concurrency between an incoming index operation of type Write Index Entry and another ongoing index operation of type Delete Index Entry or Add Index Entry, and to forbid concurrency between an incoming index operation of type Write Index Entry and another ongoing index operation of type Write Index Entry or Read Index Entry.

22. The computer program product for a database management system according to claim 12, wherein the locking strategy is arranged to allow concurrency between an incoming index operation of type Read Index Entry and another ongoing index operation of type Add Index Entry, Delete Index Entry or Read Index Entry, and to forbid concurrency between an incoming index operation of type Read Index Entry and another ongoing index operation of type Write Index Entry.

\* \* \* \* \*